United States Patent [19]

Hayward et al.

[11] Patent Number: 4,832,991
[45] Date of Patent: May 23, 1989

[54] COATING PROCESS

[75] Inventors: Jack Hayward, Hilton; Gerald G. Reafler, Rochester; James R. Schuler, Brockport, all of N.Y.

[73] Assignee: Eastman Kodak Company, Rochester, N.Y.

[21] Appl. No.: 189,090

[22] Filed: May 2, 1988

Related U.S. Application Data

[63] Continuation-in-part of Ser. No. 116,426, Nov. 3, 1987.

[51] Int. Cl.[4] .......................... B05D 1/36; B05D 3/02; B05D 7/00
[52] U.S. Cl. ................................ 427/393.5; 118/410; 427/407.1; 427/412.1; 430/935
[58] Field of Search ............... 427/393.5, 412.1, 407.1; 430/935; 118/410

[56] References Cited

U.S. PATENT DOCUMENTS 2,912,343  11/1959  Collins et al. .......................... 117/34
4,719,132   1/1988  Porter, Jr. ............................. 427/409
4,745,011   5/1988  Fukata et al. .......................... 427/426

OTHER PUBLICATIONS

Saunders, I. H. et al., *Polyurethanes Chemistry and Technology*, Robert E. Krieger Publishing Co., Malabar, Fla., 1983, pp. 231–233, 464.
"Manual No. 807", Chemineer Kenics, North Andover, Mass., Revised Jan. 1, 1982.
"Paint and Surface Coatings: Theory and Practice", R. Lambourne, Editor, Ellis Horwood Limited, Publishers, 1987, p. 94.
"Automobile Coatings" by B. N. McBane, Sep. 1987, pp. 53–54.

*Primary Examiner*—Michael Lusignan
*Attorney, Agent, or Firm*—William J. Davis

[57] ABSTRACT

A process for continuous coating of a reactive clearcoat composition on a painted-coated moving plastic film web by means of a laminar flow extrusion coating hopper wherein the reactive components of the composition are fed continuously to a mixing zone and mixed shortly before the composition is coated on the film surface.

4 Claims, 2 Drawing Sheets

COATING PROCESS

RELATED APPLICATIONS

This application is a continuation in part of the application of Gerald G. Reafler, Ser. No. 116,426 filed Nov. 3, 1987.

FIELD OF THE INVENTION

This invention relates to a process for applying to a plastic film a reactive coating composition and, more particularly, to a process for coating a crosslinkable clearcoat over a basecoat paint layer on the film.

BACKGROUND

The application of clear top coats over basecoat paint layers is becoming increasingly popular in the automotive industry. In such a color-plus-clear or basecoat/clearcoat system the pigmented basecoat is sprayed on the automotive panel and is overcoated with a reactive clear composition which crosslinks and hardens after being sprayed and dried. For example, the recent patent to Simpson et al, U.S. Pat. No. 4,681,811, describes a transparent topcoat formed by spraying over the paint layer a liquid crosslinkable composition comprising a polyepoxide and a polyacid curing agent. According to the patent, this provides a composite with outstanding gloss and distinctness of image. Simpson et al give no suggestion that any problems result from mixing the components of the clearcoat composition well in advance of spraying the mixture.

Another kind of clear top coat composition for application by spraying is described by Ambrose et al, U.S. Pat. No. 4,699,814. This contains a low molecular weight epoxy-functional polyurethane obtained by reacting an isocyanate with a hydroxy polyepoxide. A polyacid curing agent is used. Again no problem is indicated with mixing the components well before the mixture is applied.

Recently a new process for applying paints and clearcoats to automobile bodies and other three dimensional articles which yields finishes of outstanding quality has been described in the Reafler patent application Ser. No. 116,426. The new process involves coating one side of a stretchable polymeric film by laminar flow with a pigmented basecoat, thereafter applying a clearcoat over the basecoat and applying an adhesive layer to the other side of the film, which then is adhered by thermoforming to automobile body panels or other substrates, for example, in the manner described in European Patent Application 0251546 published Jan. 7, 1988. The coating technique used for optimum quality involves the continuous laminar flow coating of a moving web of the plastic film by contact with a horizontally extending bead of the liquid coating composition. The latter is extruded from a narrow horizontal slot of an extrusion coating hopper.

Extrusion coating hoppers have been used previously in precision coating of photographic goods, as disclosed, for example, in the patent to Miller et al, U.S. Pat. No. 3,206,323. They can produce coatings having exceptional smoothness, gloss and other good qualities. They are, however, more sensitive to problems with the feed composition than is the conventional spray painting method of applying clear coats to automobile bodies. Thus, it has been found that reactive clearcoat compositions begin to increase in viscosity soon after the components are mixed. If the mixed clearcoat composition is held in a supply vessel for an excessive length of time before being fed to the extrusion hopper the viscosity of the feed composition may increase during the coating operation. When this occurs, the extrusion hopper may produce coatings of less than optimum quality.

It has also been found that after the components of the clearcoat have been mixed in the supply vessel, heterogeneous particles or slugs of polymer begin to form. These tend to stick to the metal in and around the coating hopper exit slot and cause line defects in the coatings. Evidently neither of these phenomena cause problems when reactive clearcoat compositions are sprayed, possibly because the high shear of the spray nozzles lowers the viscosity of the coating composition.

In accordance with the present invention it has been found that potential problems in the coating of batch mixed reactive clearcoats on paint-coated polymeric films through the narrow slot of an extrusion coating hopper can be reduced or avoided by mixing continuous streams of the components of the clearcoat shortly before the mixture is coated on the moving plastic film web.

BRIEF SUMMARY OF THE INVENTION

The process of the invention provides a further improvement in the manufacture of flexible and stretchable sheet material adapted for use in a thermoforming process in which it is stretched to conform to a three-dimensional substrate and bonded thereto so as to form a smooth and wrinkle-free protective and decorative coating thereon. The process of the invention comprises the steps of:

(1) providing a thin, essentially planar, stretchable, thermoplastic polymeric support of substantially uniform thickness;

(2) providing a fluid paint composition comprising a film-forming binder and a colorant;

(3) forming a laminar flow of said paint composition and directing said flow into contact with the surface of said thermoplastic polymeric support to form thereon a thin paint layer of substantially uniform thickness;

(4) converting said paint layer to a dry and tack-free state;

(5) continuously passing a web of said sheet material having on its surface the dried paint layer in proximity to a coating hopper having a narrow horizontal extrusion slot, (6) continuously feeding to a mixing zone as a first component a clear solution of a crosslinkable film-forming polymer, (7) continuously feeding to the same mixing zone as a second component a crosslinking agent for said film-forming polymer, (8) continuously feeding the resulting mixture from said mixing zone directly to said hopper and (9) extruding the mixture in laminar flow through said slot to form a clearcoat over the dried paint layer of the web, said mixture being extruded within less than about 50 seconds after being formed in the mixing zone.

THE DRAWINGS

The invention will be further described with reference to the drawings of which

DETAILED DESCRIPTION

Figures 1, 2:
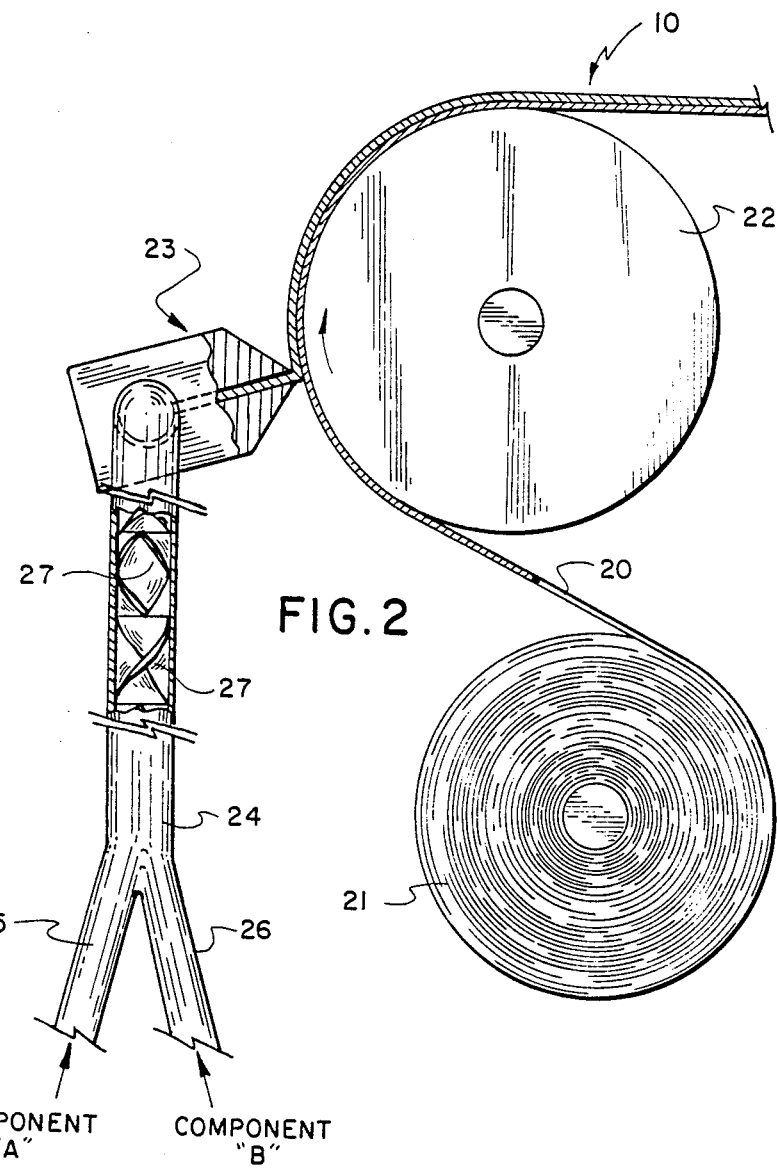
FIG. 1 is a diagrammatic cross section of a coated film made by the method of the invention.
FIG. 2 is a diagrammatic side view, partly in section, of apparatus in which the method of the invention can be carried out.

FIG. 1 is a diagrammatic cross-sectional side view, not to scale, of a flexible and stretchable sheet material or film 10 of the kind described in the parent application of G. G. Reafler. The film 10 comprises a thin flexible carrier film 11 which is an essentially planar, self-supporting, stretchable, thermoplastic polymeric film. It has a substantially uniform thickness in the range from about 0.05 to 0.40 millimeters. A preferred mean thickness is in the range from about 0.16 to 0.32 millimeters.

Suitable polymeric materials for the carrier film 11 include stretchable thermoplastic polymers having heat softening and tensile elongation properties which are suitable for thermoforming or vacuum forming processes. Especially useful are the stretchable blended compositions disclosed in the patent to Weemes et al U.S. Pat. No. 4,582,876.

Coated on the carrier film 11 is a basecoat or paint layer 12 which has a mean dry thickness in the range from about 0.012 to 0.080 millimeters and, preferably, from about 0.02 to 0.06 millimeters. The paint layer is formed by laminar flow coating of a basecoat composition of the types used for automotive finishes. The preferred compositions are aqueous dispersions of a film-forming binder resin and pigment with one or more organic solvents which serve as coalescing agents or the like.

Although not essential in all cases, a thin bonding layer or tie coat 13 can be coated and dried on the carrier film before the paint layer is coated in order to improve the bonding of the paint layer to the carrier film. This layer preferably has a dry thickness not greater than about 0.0025 millimeter, and thus is much thinner than the dried basecoat.

The next layer, i.e., the crosslinked clearcoat layer 14 of FIG. 1., is the layer to which the process of the present invention particularly applies. Crosslinkable clearcoat compositions for use with basecoats are known in the art. They are transparent and comprise (a) as one component, a crosslinkable polymer such as a polyester polyol, a polyurethane polyol, or an acrylic polyol and (b) as a second component, a curing or crosslinking agent such as a polyisocyanate. Each component is dissolved in a volatile organic solvent such as acetone or toluene.

The dry thickness of the clearcoat preferably is somewhat greater than that of the basecoat. It usually is in the range from about 0.02 to 0.08 mm and preferably from about 0.03 to 0.07 mm. In view of its thickness the clearcoat can, if desired, be coated in two or more passes through the coating process in order to provide layers that are thin enough for the most effective drying.

The process of the invention can be practiced with a wide range of reactive, crosslinkable clearcoat compositions that are prepared for coating by mixing two or more reactive components before coating the mixture on a substrate. The process offers advantages with any such compositions that are suitable for coating over a basecoat on a carrier film and which are so reactive that the mixture is difficult to coat by means of an extrusion hopper. Examples of such compositions include crosslinking polyurethane film-forming compositions which are formed by the reaction of a crosslinkable urethane polymer with a crosslinking agent. One such composition is the solvent-based system comprising a polyurethane polyol as one component and a polyisocyanate as the other, as disclosed in the patent to Porter, U.S. Pat. No. 4,719,132. Especially preferred is a two-component composition disclosed in this patent, of which one component comprises a crosslinkable poly(ester-urethane) polyol and the other comprises a polyisocyanate crosslinking agent such as a polyfunctional aliphatic isocyanurate of 1,6-hexamethylene diisocyanate.

Another useful clearcoat composition is the crosslinking epoxy-functional polyurethane which is prepared by reacting an isocyanate with a hydroxyl-functional polyepoxide having two or more epoxy groups per molecule, then mixing the resulting product with a curing agent such as a polyacid, anhydride, and/or polyamine and curing the coated mixture, as described in the patent to Ambrose et al, U.S. Pat. No. 4,699,814. Other examples include the crosslinkable epoxy polymers, such as epoxy-containing acrylic polymers, that are mixed with a polyacid curing agent, such as the half-ester reaction products of a polyol and a carboxylic acid anhydride, as disclosed in the patents to Simpson et al, U.S. Pat. No. 4,650,718; Simpson et al, U.S. Pat. No. 4,681,811; and Singer et al, U.S. Pat. No. 4,703,101. Other examples include the compositions disclosed in the patents to Backhouse, U.S. Pat. Nos. 4,220,679 and 4,403,003 in which one component is a solution of a crosslinkable acrylic polymer and the other is a solution of a crosslinking agent. All of the cited patents are incorporated by reference herein.

Since the sheet material, made by the process of the invention is intended to be stretchable in thermoforming processes, its layers, including the topcoat or clearcoat, ae selected from materials which have the desired stretchability and compatibility with the other layers with respect to physical properties. Especially desirable in the respects are polyurethane coating compositions cited above.

Although in the spray drying of clearcoats the components can be mixed a substantial time before spraying them, the applicants have found that when the clearcoat components are mixed as a batch before coating, the viscosity of the mixture increases with time and requires changes in the coating conditions such as hopper spacing, temperature, etc. This problem is avoided in accordance with the invention by mixing the components continuously just before coating.

FIG. 2 illustrates the procedure schematically. A web of paint-coated film 20 is fed from a supply roll 21 to a roll 22 opposite a hopper coating station 23. The latter comprises a slotted extrusion hopper of known design, e.g., as shown in the patent to Beguin, U.S. Pat. No. 2,681,294 or the patent to Bartlett et al, U.S. Pat. No. 3,227,136. The mixed clear coat composition is continuously fed to the hopper via line 24. The components A and B of this clear coat composition are fed by supply lines 25 and 26 and are mixed in line 24.

Figure 3:
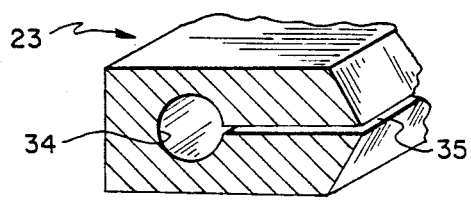
FIG. 3 is a diagrammatic perspective view in section of a coating hopper having a narrow extrusion slot.

FIG. 3 illustrates in more detail the structure of a type of coating hopper for which the method of the invention is especially adapted. This hopper is formed of a metallic block having an interior supply cavity 34 which communicates with the inlet line 24 of FIG. 2 and with the narrow extrusion slot 25. In this manner, a continuous flow of the clearcoat composition is delivered in laminar flow to the surface of the moving film on roll 22 of FIG. 2.

The particular means used for mixing the components of the clearcoat composition immediately before the coating operation can be selected from a number of possible mixing devices. The main requirements are (a) that the device should efficiently and without contamination form a substantially homogeneous mixture, (b) that the device should handle continuous inlet streams of the components and a continuous outlet stream of the mixture and (c) that the residence or dwell time of the mixture in the device should be brief so that the mixture is fed to the coating slot within less than about 50 seconds and, preferably, less than about 30 seconds after mixing.

Figure 4:
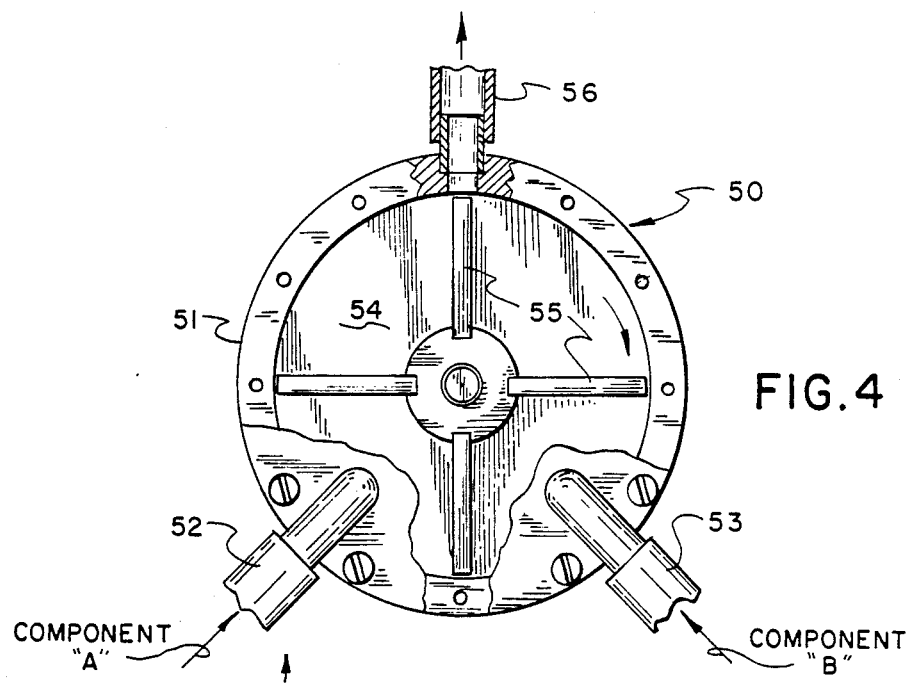
FIG. 4 is a diagrammatic plan view, partly broken away, of one form of mixing means useful in the method of the invention.
Figure 5:
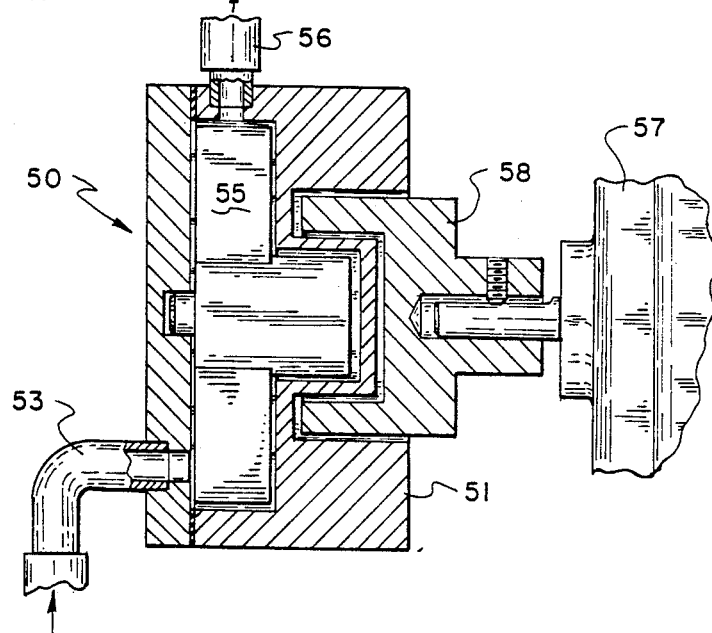
FIG. 5 is a sectional side view of the mixing means of FIG. 4.

Two examples of suitable mixing means which meet the requirements are shown schematically in FIGS. 2, 4 and 5. One suitable means is an in-line mixing device in the form of baffles in the feed line 24. Such a device is shown in partial cross-section in FIG. 2 and comprises a series of baffles 27 which provide alternately reversed helical paths for the liquid and achieve intimate mixing. A preferred device of this kind is the "Kenics Mixer", a tube mixer of Chemineer Kenics, Dayton, Ohio 45401. The fluid components A and B are fed continuously via lines 25 and 26 and mix as they flow through the baffled path provided by baffle 27 in line 24.

Also useful are magnetic mixers such as the mixer 50 shown in FIGS. 4 and 5. This device comprises a housing 51 which receives the inlet lines 52 and 53 through which flow the separate components A and B of the topcoat. The streams flow into chamber 54 where they are mixed by the blades 55 of a rotating impeller or agitator, the resulting mixture flowing out to the coating hopper by line 56. The blades of this mixer are driven magnetically by means of a motor 57 and rotating magnet 58.

Not shown in the drawing are desirable adjuncts of the mixing devices and the conduits connected to them, such as valves and flush lines for cleaning out the devices.

The invention is further illustrated by the following examples, the first of which is a comparison example. It demonstrates the difficulties encountered in batch mixing of the clearcoat components before coating. Following it is an example illustrating the practice of the invention.

COMPARISON EXAMPLE

A clearcoat composition was prepared for coating over a paint layer on a stretchable thermoplastic film from components A and B having the following compositions:

|  | Approx. % Weight |
|---|---|
| Component A | |
| (Crosslinkable Polymer) | |
| Urethane Resin | 60 |
| Toluene | 40 |
| Benzotriazole | 1 |
| *Component B | |
| (Crosslinking Agent) | |
| Polyfunctional aliphatic isocyanurate resin based | 100 |
| on 1,6-hexamethylene diisocyanate | |

*Available as Desmodur N-3300 from Mobay Corporation Coatings Division.

Component A diluted to 49% solids with acetone and component B diluted to 70% solids with acetone were mixed at room temperature in a vessel in a ratio of about 5.4 to 1 by weight. After about 40 minutes at 30 degrees C. the mixture had approximately doubled in viscosity and could not be coated satisfactorily without substantial changes in the coating conditions.

EXAMPLE OF THE INVENTION

The components of the clearcoat described in the Comparison Example were fed continuously and separately in the same weight ratios as in the Comparison Example to a magnetic mixer of the type shown in FIGS. 4 and 5. The resulting mixture was fed continuously from the magnetic mixer to an extrusion coating hopper as in FIG. 1 and coated on a moving film web having a dried paint layer on its surface. The total time elapsing from the time of mixing to the time of coating was only about 18 to 23 seconds. The coating operation continued without difficulty. The wet coating was dried in a slow air stream at about 40-90 degrees C. for several minutes to form over the paint layer a smooth, hard clearcoat of approximately 0.032 millimeter (1.25 mil) dry thickness and of excellent quality.

The invention has been described in detail with particular reference to preferred embodiments thereof, but it will be understood that variations and modifications can be effected within the spirit and scope of the invention.

We claim:

1. A process for the manufacture of a flexible and stretchable sheet material adapted for use in a thermoforming process in which it is stretched to conform to a three-dimensional substrate and bonded thereto so as to form a smooth and wrinkle-free protective and decorative coating thereon, said process comprising the steps of:

(1) providing a thin, essentially planar, stretchable, thermoplastic polymeric support of substantially uniform thickness;

(2) providing a fluid paint composition comprising a film-forming binder and a colorant;

(3) forming a laminar flow of said paint composition and directing said flow into contact with the surface of said thermoplastic polymeric support to form thereon a thin paint layer of substantially uniform thickness;

(4) converting said paint layer to a dry and tack-free state;

(5) continuously passing a web of said sheet material having on its surface the dried paint layer in proximity to a coating hopper having a narrow horizontal extrusion slot, (6) continuously feeding to a mixing zone as a first component a clear solution of a crosslinkable film-forming polymer, (7) continuously feeding to the same mixing zone as a second component a solution of a crosslinking agent for said film-forming polymer, (8) continuously feeding the resulting mixture from said mixing zone directly to said hopper and (9) extruding the mixture in laminar flow through said slot to form a clearcoat over the dried paint layer of the web, said mixture being extruded within less than about 50 seconds after being formed in the mixing zone.

2. The process according to claim 1 wherein the coated web is thereafter passed continuously through a heated drying zone to convert the clearcoat to a crosslinked tack-free state.

3. The process according to claim 2 wherein the first component comprises a crosslinkable urethane polymer and the second component comprises an isocyanate.

4. The process according to claim 3 wherein the mixture is extruded within less than about 25 seconds after being formed in the mixing zone.

* * * * *